United States Patent
Lee et al.

(10) Patent No.: US 10,496,348 B2
(45) Date of Patent: Dec. 3, 2019

(54) DISPLAY DEVICE AND METHOD OF CONTROLLING THEREFOR

(71) Applicant: LG ELECTRONICS INC., Seoul (KR)

(72) Inventors: Younkyung Lee, Seoul (KR); Yoonjae Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 8 days.

(21) Appl. No.: 15/628,849

(22) Filed: Jun. 21, 2017

(65) Prior Publication Data

US 2017/0371609 A1  Dec. 28, 2017

(30) Foreign Application Priority Data

Jun. 22, 2016 (KR) .................. 10-2016-0077847

(51) Int. Cl.
*G06F 3/14* (2006.01)
*G06F 3/00* (2006.01)
(Continued)

(52) U.S. Cl.
CPC ............. *G06F 3/14* (2013.01); *G06F 3/00* (2013.01); *G06F 3/011* (2013.01); *G06F 3/017* (2013.01); *G06F 3/03547* (2013.01); *G06F 3/04845* (2013.01); *G06F 3/04847* (2013.01); *G09G 3/001* (2013.01); *H04M 1/72533* (2013.01);
(Continued)

(58) Field of Classification Search
CPC ........ G06F 3/14; G06F 3/011; G06F 3/03547; G06F 3/04847; G06F 3/017; G06F 3/04845; G06F 3/00; G09G 3/001; G09G 2370/06; G09G 2370/02; G09G 2354/00; G09G 2320/02; G09G 2320/0233;
(Continued)

(56) References Cited

U.S. PATENT DOCUMENTS

2007/0236411 A1* 10/2007 Kurosaki .............. G06F 1/1601
345/30
2011/0074312 A1  3/2011 Liao
(Continued)

FOREIGN PATENT DOCUMENTS

EP  2 843 638  3/2015

OTHER PUBLICATIONS

International Search Report dated Sep. 20, 2017 issued in Application No. PCT/KR2017/006504.

*Primary Examiner* — Brent D Castiaux
(74) *Attorney, Agent, or Firm* — Ked & Associates LLP

(57) ABSTRACT

The present invention relates to a display device and a method of controlling therefor. According to one embodiment of the present invention, a display device includes a memory configured to store at least one or more contents, at least one or more sensors, a network interface module configured to communicate with at least one or more lights, a display module configured to output the at least one or more contents stored in the memory, and a controller coupled with the memory, the sensor, the network interface module and the display module. In this case, the controller controls the display module to output specific content stored in the memory at specific timing and controls the network interface module to transmit a control signal to a specific light at the specific timing.

7 Claims, 16 Drawing Sheets

(51) Int. Cl.
*G06F 3/01* (2006.01)
*G06F 3/0484* (2013.01)
*G09G 3/00* (2006.01)
*H05B 37/02* (2006.01)
*H04N 9/31* (2006.01)
*H04M 1/725* (2006.01)
*G06F 3/0354* (2013.01)
*H05B 33/08* (2006.01)

(52) U.S. Cl.
CPC ......... *H04N 9/3164* (2013.01); *H05B 33/086* (2013.01); *H05B 37/029* (2013.01); *H05B 37/0227* (2013.01); *H05B 37/0281* (2013.01); *G09G 2300/00* (2013.01); *G09G 2300/02* (2013.01); *G09G 2320/02* (2013.01); *G09G 2320/0233* (2013.01); *G09G 2354/00* (2013.01); *G09G 2370/02* (2013.01); *G09G 2370/06* (2013.01); *Y02B 20/42* (2013.01)

(58) Field of Classification Search
CPC .......... G09G 2300/02; G09G 2300/00; H04M 1/752533; H05B 37/029; H04N 9/3164; Y02B 20/42
See application file for complete search history.

(56) References Cited

U.S. PATENT DOCUMENTS

| | | | |
|---|---|---|---|
| 2011/0312422 A1* | 12/2011 | Ackley | G08C 17/02 463/41 |
| 2013/0271004 A1* | 10/2013 | Min | H05B 33/0842 315/112 |
| 2014/0246991 A1* | 9/2014 | Kim | H05B 37/0227 315/292 |
| 2014/0285113 A1 | 9/2014 | Huang | |
| 2015/0282282 A1* | 10/2015 | Breuer | H05B 37/0272 315/152 |
| 2016/0073482 A1* | 3/2016 | Fok | H04L 12/282 315/294 |
| 2016/0105645 A1* | 4/2016 | Yamazaki | H04N 7/181 348/159 |

* cited by examiner

FIG. 6

| light ID | location information |
|---|---|
| ID #1 | right front in room |
| ID #2 | left front in room |
| ID #3 | right rear in room |
| ID #4 | left rear in room |
| ⋮ | ⋮ |

FIG. 7

| location of virtual object | light to be controlled |
|---|---|
| left | left light is tuned on/ rest of lights are turned off |
| right | right light is tuned on/ rest of lights are turned off |

FIG. 8

| size of virtual object | brightness of all lights |
|---|---|
| decreased | darkened |
| increased | brightened |

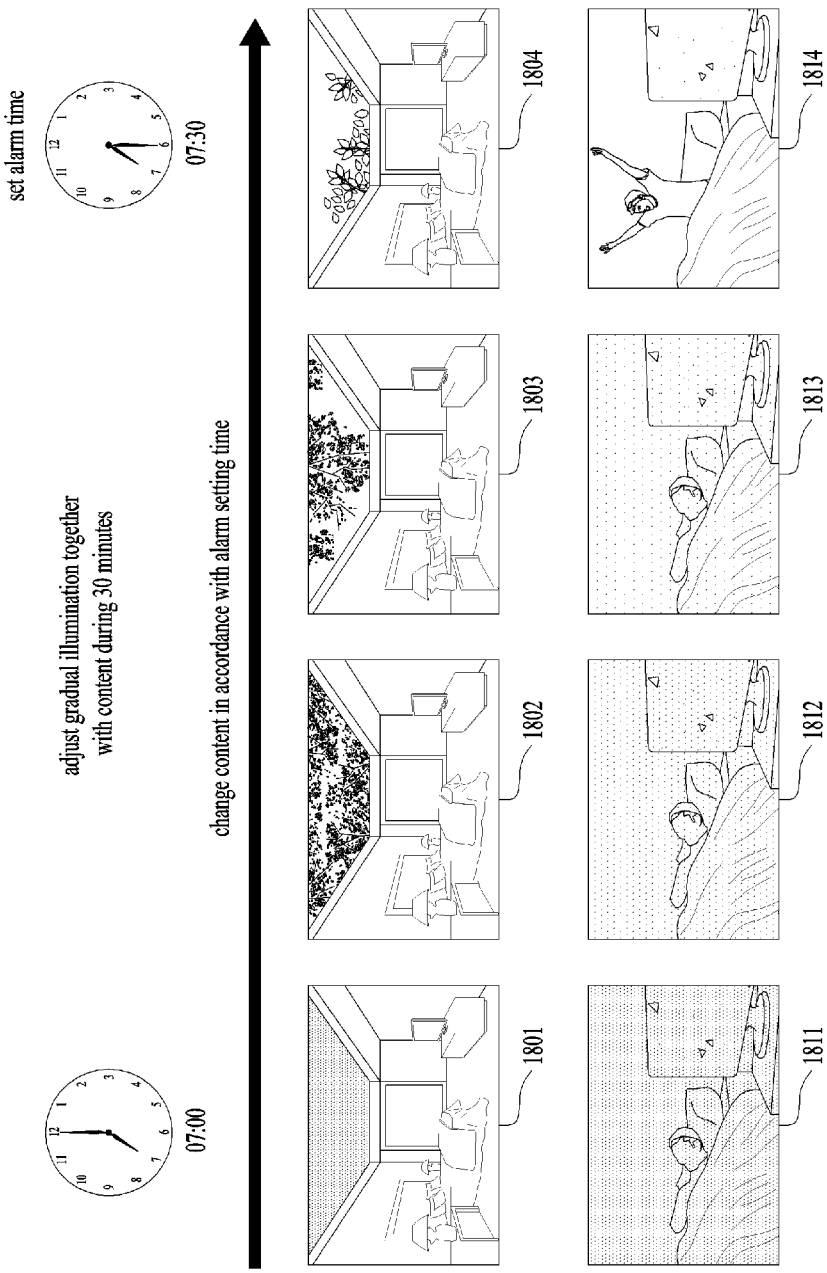

DISPLAY DEVICE AND METHOD OF CONTROLLING THEREFOR

This application claims the benefit of the Korean Patent Application No. 10-2016-0077847, filed on Jun. 22, 2016, which is hereby incorporated by reference as if fully set forth herein.

BACKGROUND OF THE INVENTION

Field of the Invention

The present invention relates to a display device and an apparatus therefor, and more particularly, to a system that a display device and a light interact with each other. The system can be applied to IoT (Internet of Things) environment as well.

Discussion of the Related Art

IoT (Internet of Things) corresponds to environment capable of sharing information and controlling things (devices) inside of our life by connecting the things with each other using a wired/wireless network. It is able to share information by connecting things with each other using a network in various fields including not only a commonly anticipated electronic product, an electronic device but also healthcare, remote metering, smart home, a smart car, and the like.

Yet, according to a related art, since information is simply shared between devices connected by such a network as IoT. This is a current picture of IoT that interaction effect between devices is inadequate.

SUMMARY OF THE INVENTION

Accordingly, the present invention is directed to an apparatus and method thereof that substantially obviate one or more problems due to limitations and disadvantages of the related art.

An object of the present invention is to define a control technology between a light capable of performing communication and a display device.

Another object of the present invention is to provide a display device capable of individually or comprehensively managing a plurality of lights.

The other object of the present invention is to provide a solution capable of controlling lights connected with each other by a network in various aspects by utilizing a specific object outputted from a display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a memory configured to store at least one or more contents, at least one or more sensors, a network interface module configured to communicate with at least one or more lights, a display module configured to output the at least one or more contents stored in the memory, and a controller coupled with the memory, the sensor, the network interface module and the display module. In this case, the controller controls the display module to output specific content stored in the memory at specific timing and controls the network interface module to transmit a control signal to a specific light at the specific timing.

According to one embodiment of the present invention, it is able to define a control technology between a light capable of performing communication and a display device.

According to a different embodiment of the present invention, it is able to provide a display device capable of individually or comprehensively managing a plurality of lights.

According to a further different embodiment of the present invention, it is able to provide a solution capable of controlling lights connected with each other by a network in various aspects by utilizing a specific object outputted from a display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram for a database necessary for controlling a plurality of lights;

FIG. 7 is a diagram for a database necessary for controlling a specific light;

FIG. 8 is a diagram for a database necessary for controlling all lights;

FIG. 18 is a diagram for a process of controlling a display device and a light at the same time according to alarm setting time;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably. And, in explaining embodiment disclosed in the present specification, if it is determined that detail explanation on a related technology known to public makes a point of the embodiment disclosed in the present specification unclear, the detail explanation can be omitted. And, the attached drawings are just intended to help easily understand the embodiment disclosed in the present specification. Hence, a technical idea disclosed in the present specification may be non-limited by the attached drawings. It should be understood as the attached drawings include all changes, equivalents and substitutes included in the idea of the present invention and a technical scope.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

And, the singular number representation used in the present specification may include the plural number representation unless mentioned clearly and differently in context.

In the present application, such a terminology as 'comprise', 'include' and the like should be construed not as excluding existence of one or more characteristics, a number, a step, an operation, a component, a part or a combination thereof or a possibility of addition in advance but as designating existence of a characteristic, a number, a step, a component, a part or a combination thereof written on the disclosure.

A mobile terminal explained in the present specification may include a mobile phone, a smartphone, a laptop computer, a terminal used for digital broadcast, a PDA (personal digital assistant), a PMP (portable multimedia player), a navigation, a slate PC, a tablet PC, an ultra-book, a wearable device (e.g., a smartwatch, a smart glasses, a HMD (head mounted display)) and the like.

Figure 1:
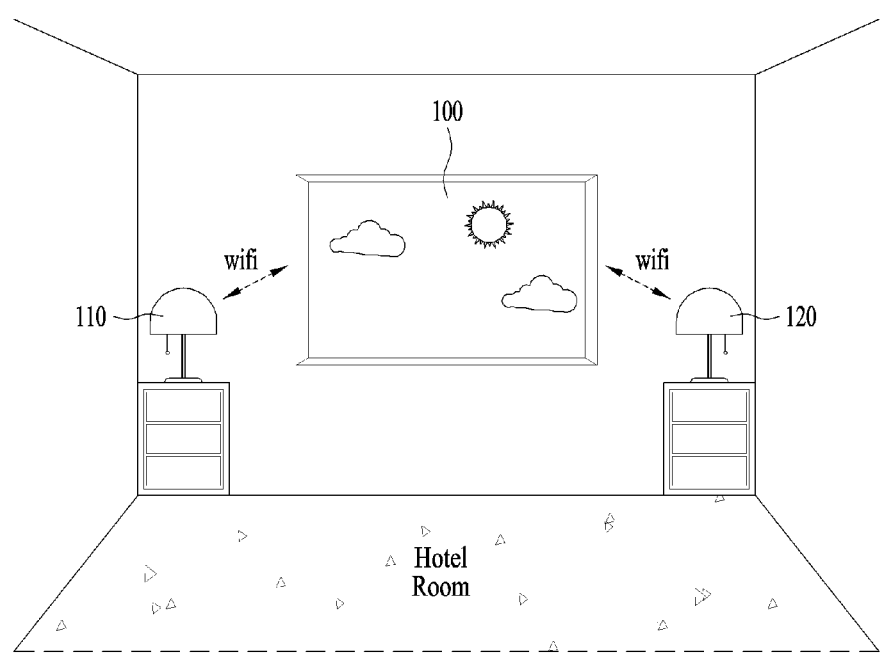
FIG. 1 is a schematic diagram for a whole system including a display device of the preset invention and a light.

FIG. 1 is a schematic diagram for a whole system including a display device of the preset invention and a light.

As shown in FIG. 1, a display device 100 according to the present invention is connected with at least one or more lights 110/120 in wired or wireless network. Although FIG. 1 shows Wi-Fi as an example of wireless network, a different communication medium can be selected.

Meanwhile, the display device 100 shown in FIG. 1 can be mounted on a ceiling of a general room or a hotel room or can be installed in the wall. An embodiment for a case of installing the display device 100 in the wall shall be described in detail later with reference to FIGS. 3A and 3B.

According to one characteristic of the present invention, lightness (brightness) of the lights 110/120 can be controlled according to content (or image) outputted from the display device 100. On the contrary, content of the display device 100 can be controlled to be appropriated for brightness of the lights 110/120.

Meanwhile, as a scheme of controlling the display device 100 controlled by a user, a touch sensor-based control, a gesture recognition-based control, a control controlled by a mobile phone or a button, and a smart TV application-based control are available. Regarding this, it shall be described later with reference to FIGS. 4A to 4D.

Moreover, the display device 100 can be designed using OLED, LED, LCD, PDP, or the like and plays contents (e.g., video image) stored in a memory or contents received through a network. In particular, it may be able to design the display device to easily recognize a gesture of a user by attaching an IR/ultra-sonic module to an edge area of the display device 100.

And, it may be able to design a different command to be transmitted to the connected lights 110/120 according to a type of contents outputted via the display device 100, outputted brightness, or the like.

Detail configuration modules necessary for the display device 100 shown in FIG. 1 are explained in detail in the following with reference to FIG. 2.

Figure 2:
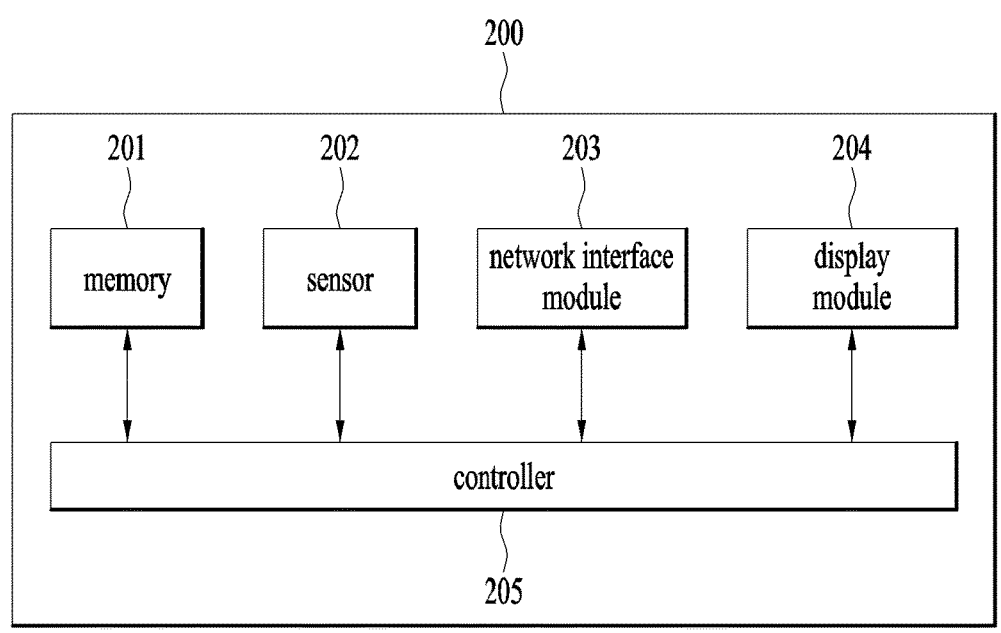
FIG. 2 is a block diagram for detail configuration modules included in a display device of the present invention.

FIG. 2 is a block diagram for detail configuration modules included in a display device of the present invention.

As shown in FIG. 2, a display device 200 according to the present invention includes a memory 201, a sensor 202, a network interface module 203, a display module 204, and a controller 205.

The memory 201 stores at least one or more contents and the sensor 202 is configured by at least one or more sensors. Regarding the sensor, it shall be described in detail later with reference to FIGS. 4A and 4B.

The network interface module 203 is designed to perform communication with at least one or more lights. Moreover, receiving random content from an external server via the network interface module 203 is one characteristic of the present invention.

The display module 204 outputs at least one or more contents stored in the memory 201 and the controller 205 is coupled with the memory 201, the sensor 202, the network interface module 203 and the display module 204.

In particular, the controller 205 controls the display module 204 to output specific content stored in the memory 201 at specific timing and controls the network interface module 203 to transmit a control signal to a specific light at the specific timing. By doing so, it may be able to obtain an effect that content outputted from the display device 200 is interworking with brightness of a light.

For example, the control signal includes ID information for identifying each light and information for displaying a level of light outputted by each light. The control signal can be stored in the memory 201 in a database form in advance. Regarding this, it shall be explained in detail with reference to FIG. 6.

The controller 205 changes specific content outputted via the display module 204 in response to status information of a light received via the network interface module 203. More specifically, for example, if the status information of the light corresponds to a level of a first light, the controller 205 controls the display module 204 to output first content stored in the memory 201. If the status information of the light corresponds to a level of a second light, the controller 205 controls the display module 204 to output second content stored in the memory 201. Regarding this, it shall be described in more detail with reference to FIG. 19.

The display module 204 displays a specific object together with the specific content. The specific object is used for controlling at least one or more lights connected with each other via the network interface module 203. Regarding the specific object, it shall be described later with reference to FIGS. 9 to 16.

The memory 201 stores a database that at least one element among a location and a size of the specific object and brightness of a light to be controlled are mapped with each other. Regarding an embodiment related to the database, it shall be described later with reference to FIGS. 7 and 8.

For example, if a location of the specific object is changed by the sensor 202, the controller 205 determines a light to be controlled with reference to the database stored in the memory 201.

As a different example, if a size of the specific object is changed by the sensor 202, the controller 205 determines brightness of a specific light with reference to the database stored in the memory 201.

The controller 205 controls output of the specific content and transmission of the control signal according to a command stored in the memory 201 in advance, a switch operation of the light, or a command received from a mobile device. Regarding this, it shall be described later with reference to FIG. 4.

Meanwhile, although a mobile device described in the present specification is not depicted, the mobile device can include a wireless communication unit, an input unit, a sensing unit, an output unit, an interface unit, a memory, a control unit, a power supply unit, and the like. Yet, since the aforementioned configuration elements are not mandatory for implementing the mobile device, the mobile device described in the present specification may have configuration elements greater than or less than the aforementioned configuration elements.

Figure 3A:
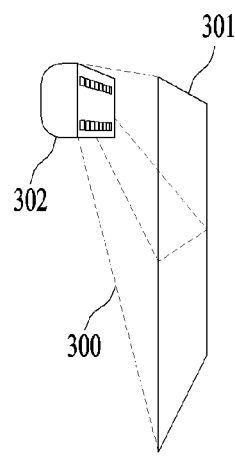
FIGS. 3A and 3B are diagrams for a shape of a display device of the present invention installed in the wall.
Figure 3B:
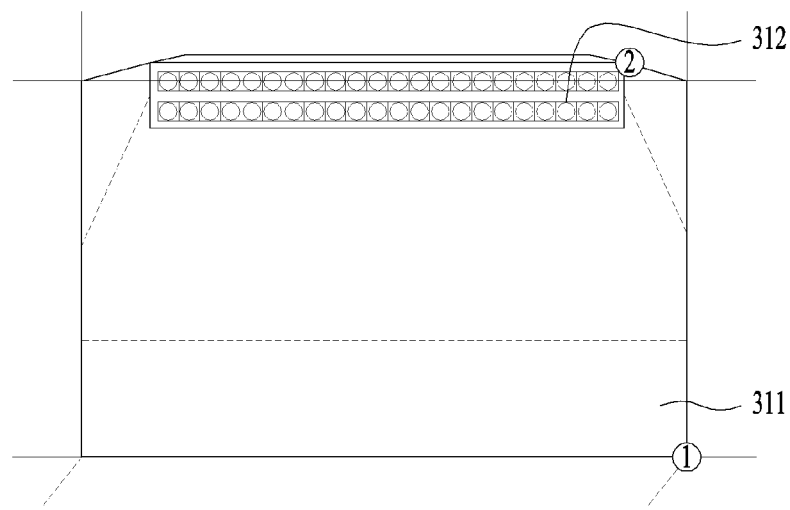

FIGS. 3A and 3B are diagrams for a shape of a display device of the present invention installed in the wall.

FIG. 3A is a side view for a shape of a display device of the present invention installed in the wall. On the contrary, FIG. 3B is a front view for a shape of a display device of the present invention installed in the wall.

As shown in FIG. 3A, for example, a display device 300 according to the present invention can be implemented by a display 301 and LED lighting 302. Yet, it is apparent that using a different medium capable of outputting content belongs to a different scope of right of the present invention.

First of all, for example, the display 301 may express such an effect as shadow via mono color reproduction by implementing the display by TOLED (transparent organic light emitting diodes). Moreover, black and white reproduction only or color reproduction can be enabled by proving 2 modes in the TOLED. For example, when lighting is projected from a back side, the display is used for implementing black and white reproduction and the display can be used for implementing color reproduction when normal content is played.

Meanwhile, an LED array configured to project light to the top and the bottom of the display 301 (or a screen) is attached to the LED lighting 302. Moreover, a random sensor (e.g., IR/Ultra Sonic module) is attached to an edge area of the LED lighting 302 to recognize a gesture of a user and control a specific object. Regarding this, it shall be described in detail with reference to FIGS. 4A and 4B.

And, since a display 311 shown in FIG. 3B corresponds to the display 301 shown in FIG. 3A and an LED lighting 312 shown in FIG. 3B corresponds to the LED lighting 302 shown in FIG. 3A, explanation on overlapped contents is omitted.

FIGS. 4A to 4D are diagrams for various tools for controlling a display device of the present invention.

First of all, a technology for controlling on/off and brightness of a light by controlling a display device is explained with reference to FIGS. 4A and 4B. And, a technology for controlling on/off and brightness of a display device by controlling a light is explained with reference to FIGS. 4c and 4D.

Figure 4A:
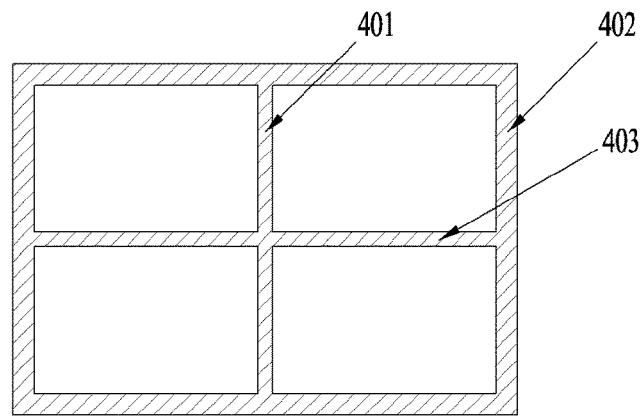
FIGS. 4A to 4D are diagrams for various tools for controlling a display device of the present invention.

First of all, as shown in FIG. 4A, a plurality of touch sensors 401/402/403 are embedded in a bezel and a frame of a display device. Hence, a plurality of the touch sensors can distinctively recognize a simple touch, swiping, pressing, dragging and the like of a user and this can be used as a technology for controlling a specific object, which is to be described later. In particular, when content of a display device is controlled by the touch of the user, on/off and brightness of a light connected with the display device via a network is changed together.

Figure 4B:
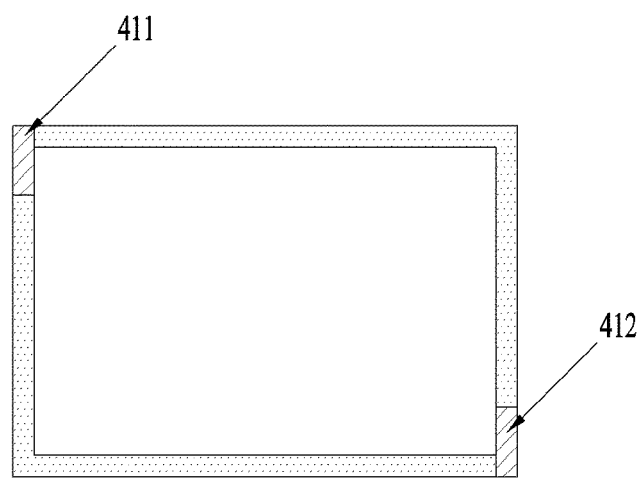

As a different method, as shown in FIG. 4B, a specific object to be described later can be controlled by recognizing a gesture. The present invention proposes two methods capable of recognizing a gesture.

First method is to recognize a gesture of a long distance (e.g., 3 to 4 meters) by attaching an IR/Ultra Sonic module to an edge area 411/412 of a display device. If sensors are attached to two positions 411/412, 2-dimensional coordination consisting of (x, y) can be enabled.

Second method is to recognize a gesture via a kinetic camera. The present invention can also be implemented by adopting a different gesture recognition tool.

In particular, when content of a display device is controlled by the aforementioned gesture, on/off and brightness of a light connected with the display device via a network is changed together.

Figure 4C:
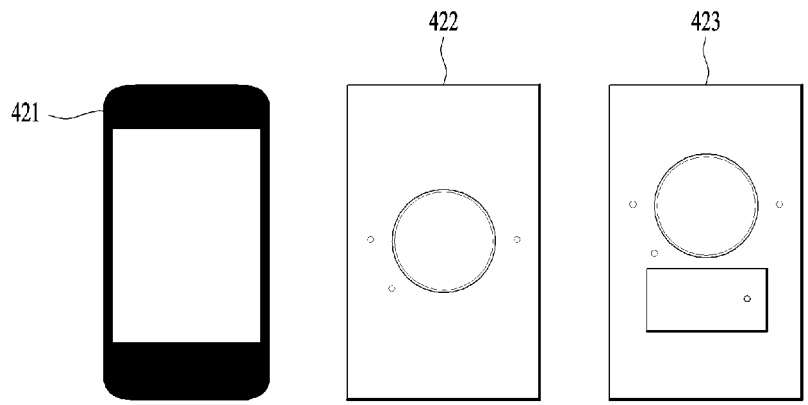

As a further different method, as shown in FIG. 4c, it may be able to control a display device in a manner of being interlocked with a mobile device 421. Or, it may be able to control a display device using a button 422 used for the display device and installed in a room or a button 423 used for a light and installed in a room. For example, if a specific application installed in a mobile device 421 is executed, power of the display device is turned on or specific content is executed. As a different example, if the button 422 used for the display device and installed in a room is pushed, power of the display device is turned on or specific content is executed. As a further different example, if the button 423 used for a light and installed in a room is pushed, it is able to design power of the display device to be turned on or it is able to design specific content to be executed. In particular, when a light is controlled via the mobile device or a switch, it may be able to control on/off, brightness, outputted content, and the like of the display device connected with the light via a network.

Figure 4D:
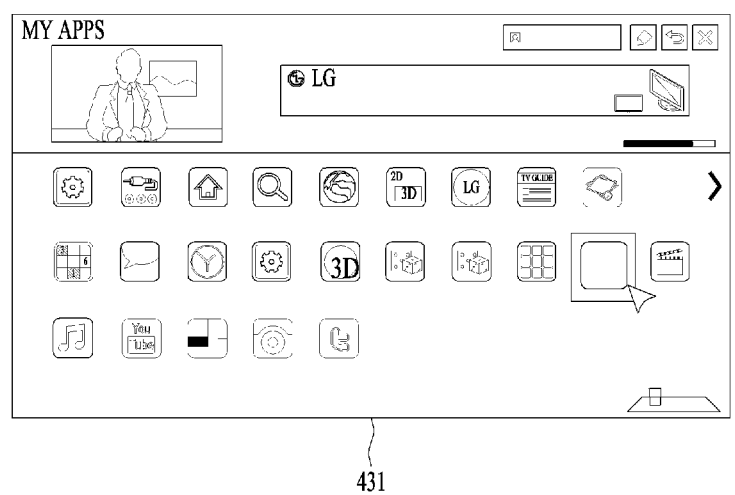

As a final method, as shown in FIG. 4D, it is able to simultaneously or individually control content of a display device and brightness of a light using a specific application installed in a smart TV 431. The specific application can be stored in a memory in advance or can be separately downloaded by a user.

In particular, when a light is controlled by operating an application installed in a smart TV, it may be able to control on/off, brightness, outputted content, and the like of a display device connected with the light via a network.

Figure 5:
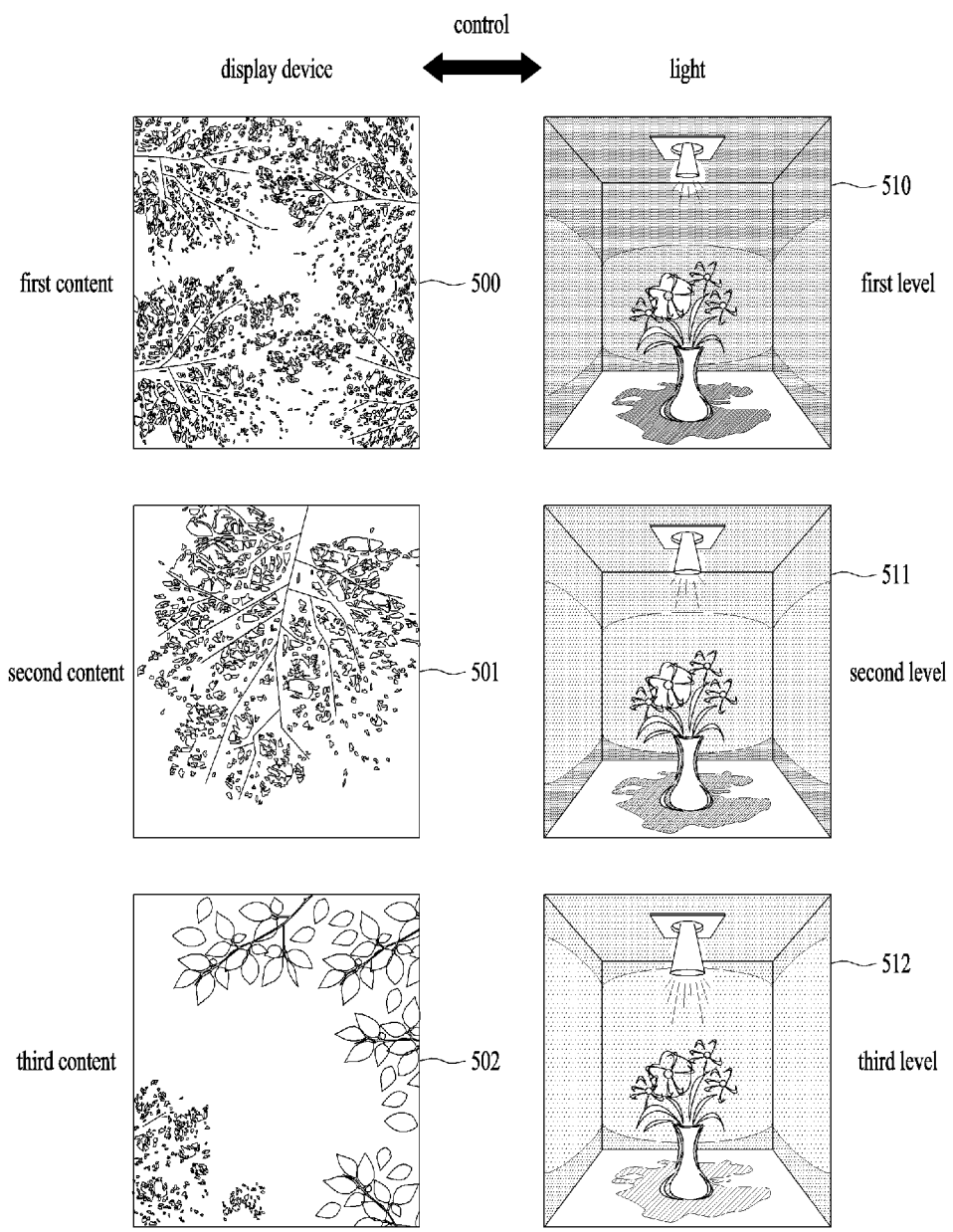
FIG. 5 is a diagram for an example of interaction between a display device of the present invention and a light.

FIG. 5 is a diagram for an example of interaction between a display device of the present invention and a light.

As mentioned in the foregoing description, one of characteristics of the present invention is that a light is automatically controlled according to a control of a display device and the display device is automatically controlled according to a control of the light.

As mentioned in the foregoing description, display devices 500/501/502 shown in FIG. 5 can be installed in the wall or can be mounted on a ceiling. Of course, adopting a television or a PC monitor instead of the display device also belongs to a different scope of right of the present invention.

If a display device 500 displays first content (e.g., a video image of a very dense forest), the display device transmits a command mapped to the first content to a light 510 connected via a network. In this case, the light 510 is adjusted by brightness (dimmed out weak light) of a first level according to the received command.

If a display device 501 displays second content (e.g., a video image of a little dense forest), the display device transmits a command mapped to the second content to a light 511 connected via a network. In this case, the light 511 is adjusted by brightness (brighter than the first level and darker than a third level to be described later) of a second level according to the received command.

If a display device 502 displays third content (e.g., a video image of small number of leaves), the display device transmits a command mapped to the third content to a light 512 connected via a network. In this case, the light 512 is adjusted by brightness (e.g., strong light) of a third level according to the received command.

In summary, a display device outputs programmed content and transmits a command according to a change of the content to a light. When the display device displays content interlocked with a light, light control information included in a playing file is transmitted to at least one or more lights installed in indoor.

Meanwhile, although it is explained as light is sequentially adjusted in FIG. 5, continuously and linearly adjusting light also belongs to a different scope of right of the present invention.

Hence, since content is naturally changed according to time change and brightness of a light is also changed according to the change of the content, it is able to have a technical effect capable of naturally inducing wake-up or sleeping. More specifically, for example, as time is getting close to morning wake-up time, an image associated with sunrise is anonymously played via a display device and color and brightness of a light is gradually brighter at the same time.

Meanwhile, although the morning wake-up time can be automatically configured, alarm for the wake-up time can also be configured using a mobile device 421 shown in FIG. 4c or a smart TV 431 shown in FIG. 4D. In this case, information on the configured alarm time is transmitted to at least one of the display device according to the present invention and the light and the information is stored in each memory. Of course, as a different embodiment, designing to transmit a specific command to at least one of the display device and the light without transmitting the information on the configured alarm time in advance also belongs to the scope of right of the present invention.

It may be able to intentionally design alarm setting time and time at which the display device or the light is controlled to be exactly same or to have a predetermined difference (e.g., −5 seconds to +5 seconds). Table 1 in the following shows embodiments different from each other.

TABLE 1

| Alarm setting time (using mobile phone or TV) | Time of controlling light | Time of controlling display device |
|---|---|---|
| A.M. 7:00 | A.M. 7:00 | A.M. 7:00 |
| A.M. 7:00 | A.M. 6:55 | A.M. 6:55 |
| A.M. 7:00 | A.M. 7:05 | A.M. 7:05 |

On the contrary, automatically changing content outputted from the display device according to a control of the light also belongs to a different scope of right of the present invention.

For example, if a light is controlled (e.g., changes brightness/color) using a lighting button, a switch or the like, content outputted by the display device also changes in accordance with the changed brightness/color of the light. More specifically, for example, if the light is darkened, the display device outputs content that covers a ceiling due to a dense forest. On the contrary, if the light is brightened, the display device outputs content that leaves are disappeared and blue sky is appearing. Although the display device corresponds to a smart digital frame, a fixed image is displayed, or a predetermined image is displayed, the same method can be applied.

FIG. 6 is a diagram for a database necessary for controlling a plurality of lights.

Although it is explained in detail with reference to FIG. 9, one of characteristics of the present invention is to control at least one or more lights using a specific object outputted from a display device.

Meanwhile, a specific object (outputted from the display device) described in the present specification and a drawing is used for controlling a light connected with the display device via a network. Hence, it is necessary to make a user easily recognize information that the user is able to control the light using the specific object. In order to make the user easily recognize the specific object within contents outputted by the display device, it is necessary for the specific object (e.g., moon, star, cloud, etc.) to include an indicator different from other images in the contents. For example, the indicator can be implemented in a manner of differentiating ambient brightness of the specific object, displaying a shadow at a boundary of the specific object, or providing 3D effect to the specific object unlike other images. Moreover, if there exist a plurality of specific objects capable of being controlled by a user, an identical indicator can be displayed on each of a plurality of the specific objects or a different indicator can be displayed on each of a plurality of the specific objects. This also belongs to the scope of right of the present invention. For example, a specific object of a relatively big size is used for controlling on/off of overall lighting and a specific object of a relatively small size is used for controlling brightness of a specific light mapped in advance. Moreover, changing an object capable of being controlled by a user also belongs to a different scope of right of the present invention.

IDs for a plurality of lights should be defined in advance. In particular, as shown in FIG. 6, An ID according to a light and location information are stored in a memory of the display device in a database form.

For example, a light of a first ID is located at a right front of a room, a light of a second ID is located at a left front of the room, a light of a third ID is located at a right rear of the room, and a light of a fourth ID is located at a left rear of the room.

Hence, it is able to individually control corresponding lights or control the lights by grouping the lights according to a position of a specific object. Regarding this, it shall be described in detail later with reference to FIG. 9.

FIG. 7 is a diagram for a database necessary for controlling a specific light.

Although it is explained in detail with reference to FIG. 9, one of characteristics of the present invention is to control a specific light only according to a position of a specific object outputted from a display device. Hence, as shown in FIG. 7, information on a specific light, which is mapped according to a position of a specific object, should be defined in advance. In particular, as shown in FIG. 7, information on a specific light, which is controlled according to a relative position of a specific object, is stored in a memory of a display device in a database form.

FIG. 8 is a diagram for a database necessary for controlling all lights.

Although it is explained in detail with reference to FIG. 9, one of characteristics of the present invention is to control brightness of a light according to a size change of a specific object outputted from a display device. Hence, as shown in FIG. 8, information on brightness of a light, which is mapped according to a size change of a specific object, should be defined in advance. In particular, as shown in FIG. 8, information on brightness of a light, which is controlled according to a relative size change of a specific object, is stored in a memory of a display device in a database form.

FIGS. 9 to 12 are diagrams for an example of controlling at least one light using a display device of the present invention.

FIGS. 9 to 12 can be implemented with reference to the database mentioned earlier in FIGS. 6 to 8, by which the present invention may be non-limited.

Figure 9:
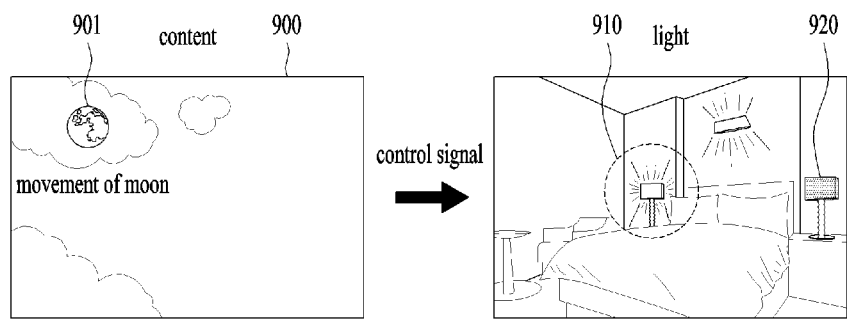
FIGS. 9 to 12 are diagrams for an example of controlling at least one light using a display device of the present invention.

As mentioned in the foregoing description, a display device 900 of the present invention shown in FIG. 9 can recognize a gesture of a user. Moreover, the display device 900 displays a specific object 901 (e.g., an image of a moon shape). If a user gesture is recognized as heading to the left, the specific object 901 also moves to the left. Accordingly, a light 910 located at the left is turned on and the rest of light 920 is turned off among a plurality of lights installed in a room.

Figure 10:
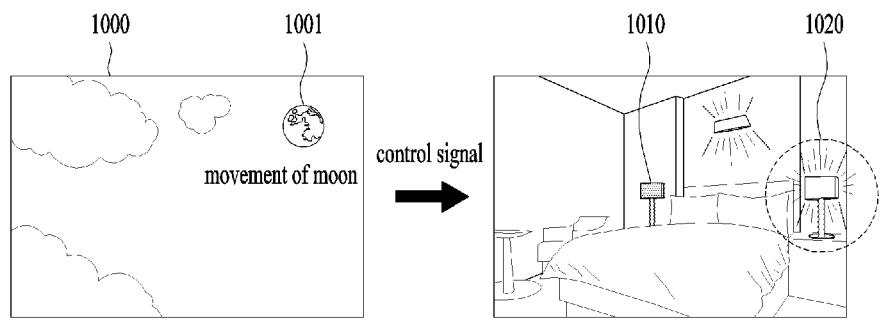

On the contrary, as shown in FIG. 10, a display device 1000 displays a specific object 1001. If a user gesture is recognized as heading to the right, the specific object 1001 also moves to the right. Accordingly, a light 1020 located at the right is turned on and the rest of light 1010 is turned off.

Meanwhile, in FIGS. 9 and 10, it has been described as on/off of a light is determined in relation to movement of a position of a specific object (moon). Moreover, as an embodiment of determining an intention of a user considering whether to move a position of the moon, if the user brings a hand of the user to the moon and selects the moon by making a fist, the position of the moon changes according to a position of the hand.

Hence, for example, if a relevant light is controlled according to a movement of the moon outputted by a display device mounted on a ceiling, it may be able to have a merit in that a user can maximize a bright area and a dark area preferred by the user.

Figure 11:
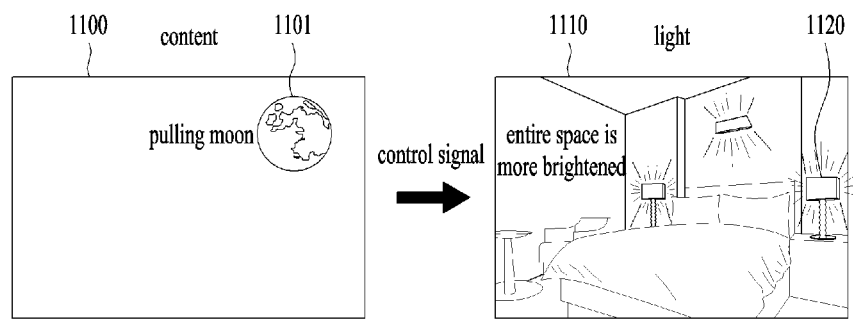

As shown in FIG. 11, a display device 1100 of the present invention displays a specific object 1101. If a gesture of slightly pulling the specific object is recognized, brightness of all lights 1110/1120 become brighter. Meanwhile, the gesture of slightly pulling the specific object may correspond to a case that the gesture is recognized for more than predetermined time (e.g., 2-3 seconds).

Figure 12:
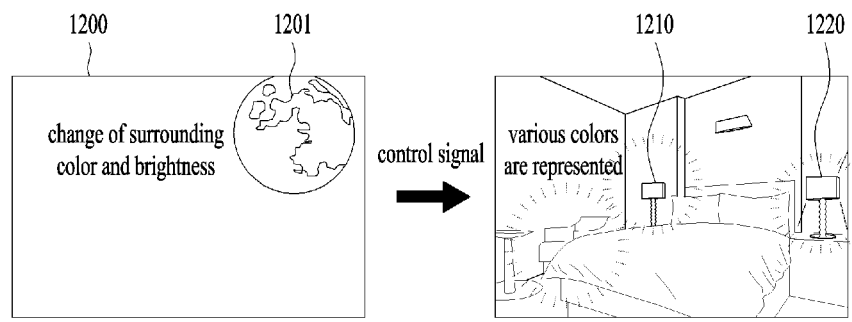

Meanwhile, as shown in FIG. 12, a display device 1200 of the present invention displays a specific object 1201. If a gesture of more pulling the specific object is recognized, brightness of all lights 1210/1220 become brighter and the lights are changed with various colors. Meanwhile, the gesture of more pulling the specific object may correspond to a case that the gesture is recognized for more than predetermined time (e.g., more than 4 seconds).

Moreover, in FIGS. 11 and 12, it has been described as brightness/color of a light is determined in relation to a position of a specific object (moon) moving to the front (pulling). Moreover, as an embodiment of determining an intention of a user considering whether to move a position of the moon to the front, if a gesture of throwing a string toward a display device or a specific object is recognized, it may be able to design to count time taken for pulling the string to enhance technical accuracy.

FIGS. 13 to 16 are diagrams for a different example of controlling at least one light using a display device of the present invention.

In FIGS. 9 to 12, it is assumed that a single specific object (moon) is used only. On the contrary, in FIGS. 13 to 16, an embodiment of using a plurality of various specific objects (e.g., video images of sun, moon, cloud, star, etc.) is explained.

Figure 13:
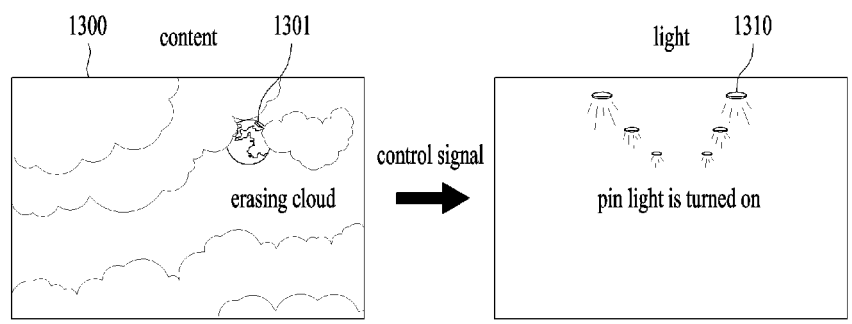
FIGS. 13 to 16 are diagrams for a different example of controlling at least one light using a display device of the present invention.

First of all, as shown in FIG. 13, if a gesture of erasing a cloud near moon 1301 corresponding to a specific object, which is displayed on a display device 1300, is recognized, pin lights 1310 are turned on only and the rest of general lights are turned off in a room in which the display device is installed. For example, if a gesture of waving a hand is recognized, the display device more clearly displays stars and lights are controlled according to the stars. Although the pin lights are described as an example in FIG. 13, replacing the pin light with other lights (pendant light, focus light, etc.) installed in indoor also belongs to a different scope of right of the present invention.

Figure 14:
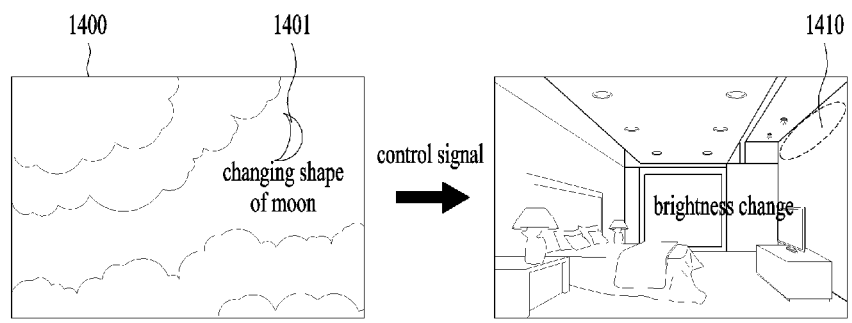

Moreover, as shown in FIG. 14, if a gesture of changing a shape of a moon 1401 corresponding to a different specific object, which is displayed on a display device 1400, is recognized, brightness of a light 1410 is changed according to the gesture. For example, if the moon 1401 corresponding to the specific object corresponds to a full moon, a light of 100% brightness is maintained. If a gesture of dividing the moon 1401 corresponding to the specific object in half is recognized, the specific object is changed to a half moon and the light is changed to a light of 50% brightness. And, if a gesture of diving the half-moon in half is recognized again, the specific object 1401 is changed to a crescent moon or a dark moon and the light is changed to a light of 25% brightness.

Figure 15:
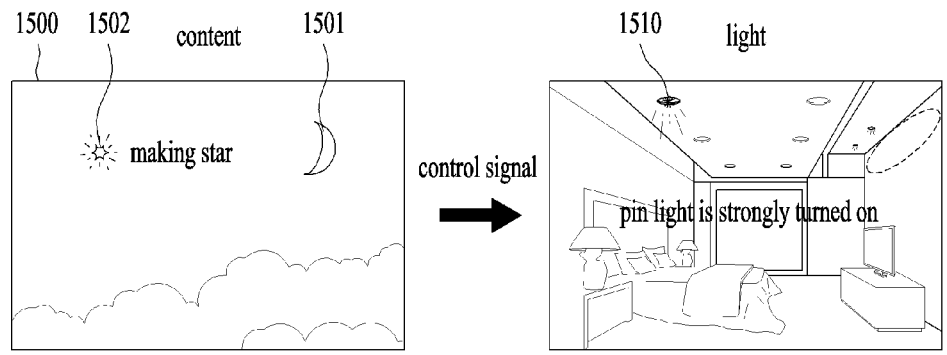

Meanwhile, as shown in FIG. 15, when a display device 1500 outputs a first specific object 1501, if a gesture of pointing out the display device using a single finger is recognized, the display device 1500 displays a star corresponding to a second specific object 1502. Accordingly, a single pin light 1510 is brightly turned on only in a room in which the display device is installed and the rest of lights are turned off.

Figure 16:
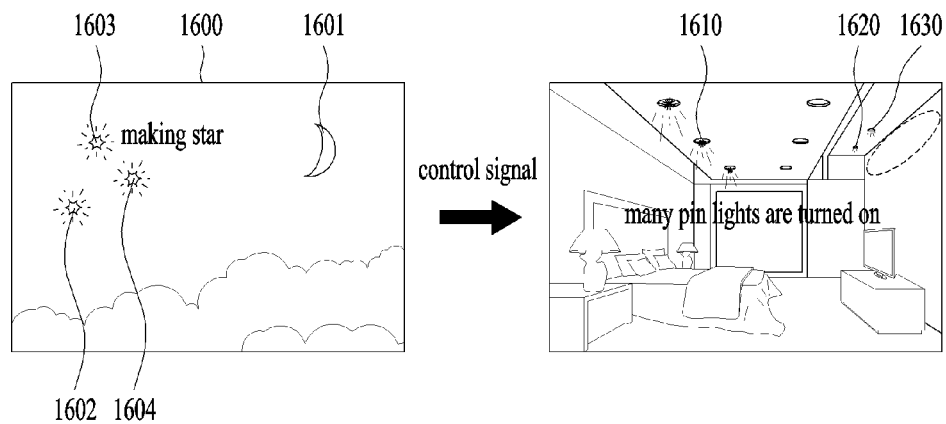

Lastly, as shown in FIG. 16, when a display device 1600 outputs a first specific object 1601, if a gesture of continuously pointing out a plurality of points of the display device 1600 using a single finger is recognized, a plurality of specific objects 1602/1603/1604 are additionally displayed in accordance with the number of recognized points and pin lights 1610/1620/1630 as many as the number of the displayed specific objects are turned on. Designing positions of the specific objects to be matched with the positions of the pin lights also belongs to a different scope of right of the present invention.

Figure 17A:
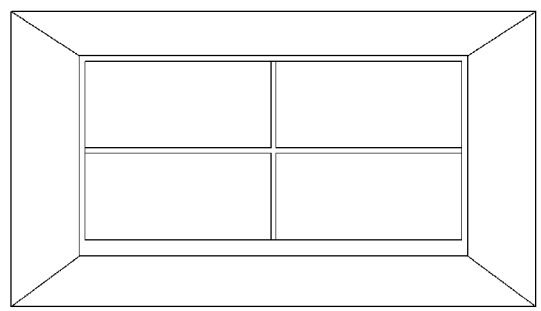
FIGS. 17A to 17C are diagrams for a further different example of controlling at least one light using a display device of the present invention.
Figure 17B:
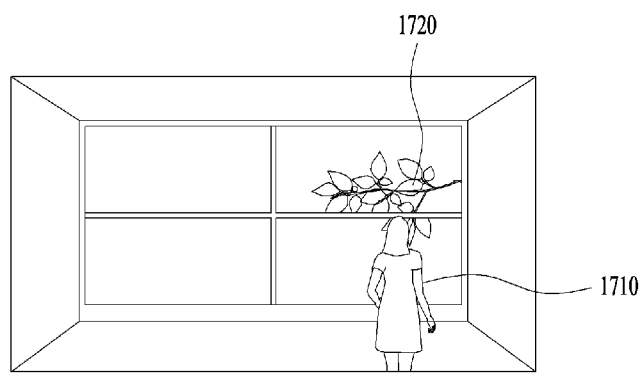
Figure 17C:
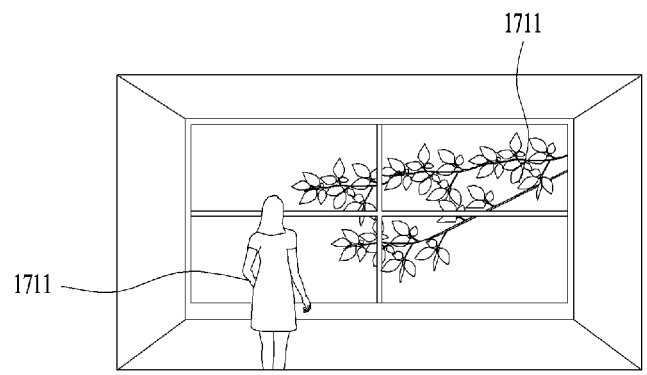

FIGS. 17A to 17C are diagrams for a further different example of controlling at least one light using a display device of the present invention.

In the previous drawings, cases of controlling a specific object, which is outputted by a display device interlocked with a light, using a hand movement (gesture) have been described. In the following, an embodiment of controlling content of a display device and a light using a movement only without a hand movement is explained. As shown in FIG. 17A, if a user is not recognized, a display device does not output any special content. Yet, as shown in FIG. 17B, if a user 1710 is recognized (e.g., using IR sensor, or the like), the display device displays specific content 1720 as much as a location of the recognized user.

Moreover, as shown in FIG. 17C, if it is recognized as a user has moved to specific direction, a display device designs specific content 1721 to be changed according to the moving direction of the user 1711.

In particular, the display device changes content (e.g., a video image of a growing tree) by anticipating a walking direction of a user in accordance with a walking speed and a stride of the user.

And, if it is recognized as a user directly touches a display device or the user is getting close to the display device, it may be able to design black and white content or color content to be played. This also belongs to a different scope of right of the present invention.

FIG. 18 is a diagram for a process of controlling a display device and a light at the same time according to alarm setting time.

In the previous drawings, an embodiment of changing content outputted by a display device and brightness/color of a light by controlling a specific object or detecting a user movement has been described. On the contrary, in FIG. 18, an embodiment of controlling content and a light according to predetermined alarm setting time is explained. In particular, a specific action of a user is not required.

First of all, assume that alarm time is set to 7:30 A.M. using a mobile device or a display device connected via a network.

As shown in FIG. 18, content of a display device and a light are continuously changing from 7:00 A.M. which is 30 minutes earlier than the alarm setting time. For example, the display device outputs first content 1801 and the light outputs brightness 1811 of a first level at around 7:00 A.M. Moreover, the display device outputs second content 1802 and the light outputs brightness 1812 of a second level at around 7:10 A.M. And, the display device outputs third content 1803 and the light outputs brightness 1813 of a third level at around 7:20 A.M. And, when the alarm setting time (i.e., 7:30 A.M.) arrives, the display device outputs fourth content 1804 and the light outputs brightness 1814 of a fourth level. The brightness of the first level is darkest and the brightness of the fourth level is brightest. Meanwhile, the first content is designed to have relatively darkest feeling and the fourth content is designed to have relatively brightest feeling.

In particular, the brightness of the light and the content of the display device are synchronized with each other. In FIG. 18, although it is assumed that wake-up alarm is set, the present invention can be applied on the basis of time for bed. Hence, since the content and the light synchronized with other are changed in accordance with the wake-up time or the time for bed, it is able to naturally lead to sleeping and wake-up.

If alarm is set on the basis of time for bed, it may be able to control a red light releasing serotonin to be turned on and such content as sunset or a night sky can be outputted via the display device.

Meanwhile, if alarm is set on the basis of wake-up time, brightness of the light is gradually brighter and content outputted via the display device is gradually changed to a clear sky as time goes by.

Figure 19:
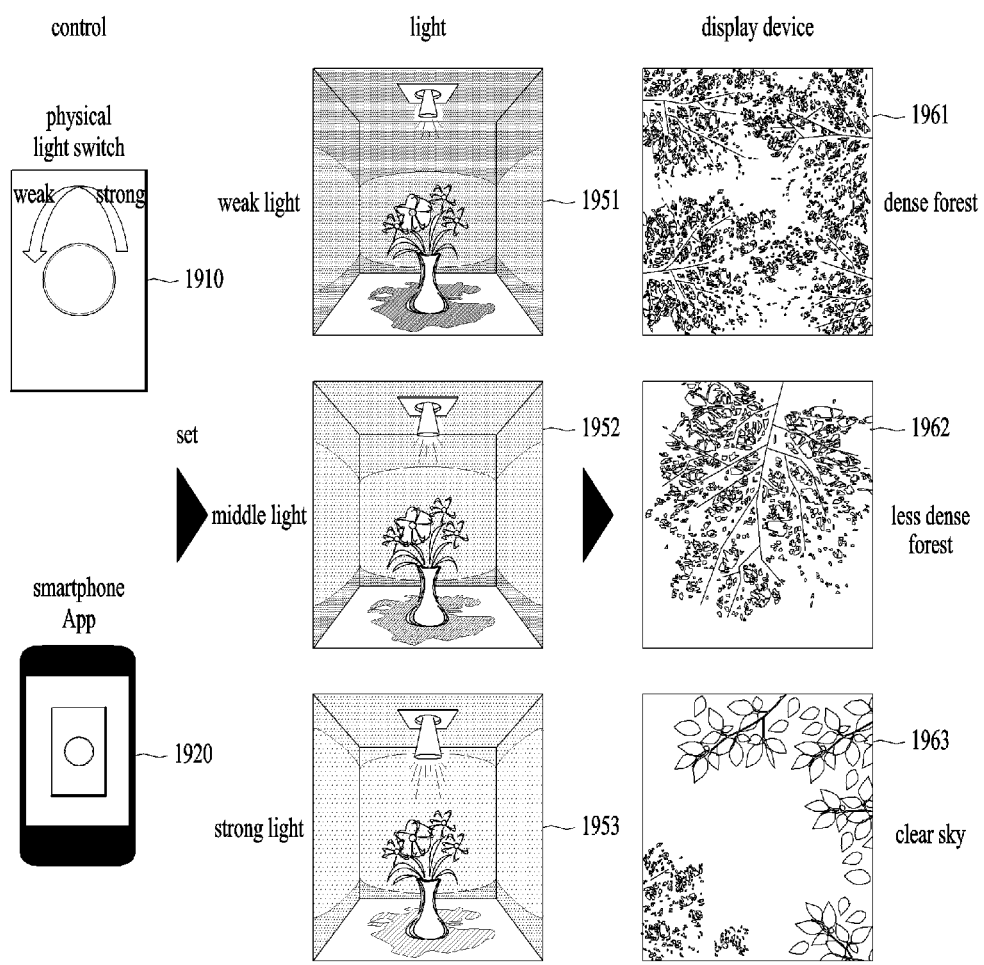
FIG. 19 is a diagram for an example of controlling a display device using a light of the present invention.

FIG. 19 is a diagram for an example of controlling a display device using a light of the present invention.

As shown in FIG. 19, a light is controlled using a physical switch 1910 of the light or a mobile device 1920, the controlled light transmits a mapped command to a display device and the display device outputs corresponding content according to the received command.

For example, if the light is controlled with lowest brightness 1951 via the switch 1910 or the mobile device 1920, the display device, which has received the command, outputs content 1961 of a dense forest.

Moreover, if the light is controlled with brightness 1952 of a middle level via the switch 1910 or the mobile device 1920, the display device, which has received the command, outputs content 1962 of a less dense forest.

And, if the light is controlled with highest brightness 1953 via the switch 1910 or the mobile device 1920, the display device, which has received the command, outputs content 1963 of a clear sky.

In particular, in summary, if the light is controlled (e.g., changing brightness/color) via a controlling device (e.g., the switch 1910, the mobile device 1920), the display device changes outputted content. For example, if the light is darkened, the display device designs the whole screen to be covered with a dense forest. On the contrary, if the light is brightened, the display device outputs content of a blue sky while leaves are disappearing.

Figure 20:
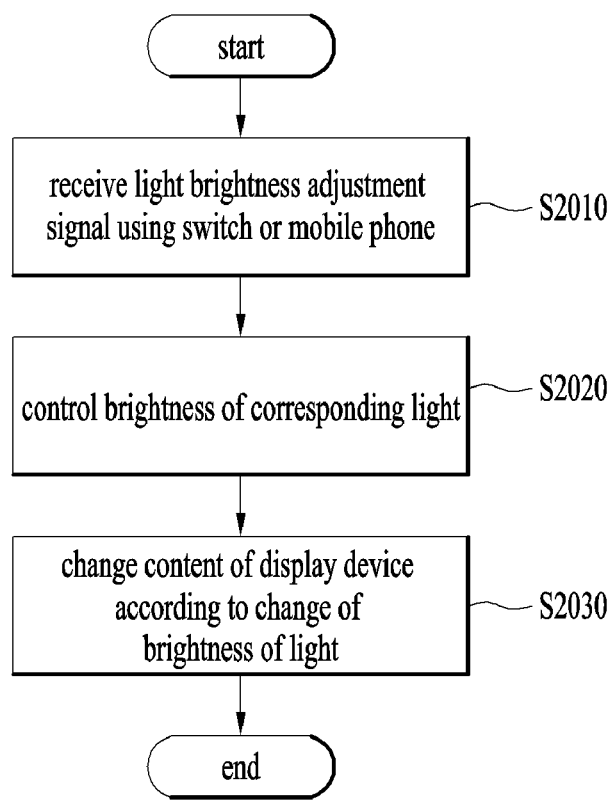
FIG. 20 is a flowchart for a method of controlling a display device of the present invention.

And, FIG. 20 is a flowchart for a method of controlling a display device of the present invention. Yet, it is apparent that implementing a different method with reference to the previous drawings also belongs to the scope of right of the present invention.

A light according the present invention receives a signal for adjusting brightness via a switch or a mobile phone [S2010] and the light is adjusted to corresponding brightness [S2020]. Moreover, a display device according to the present invention determines a type of outputted content according to information on a lighting brightness value received via the light, the switch or the mobile device [S2030].

Terminologies used in the present invention correspond to terminologies which are defined in consideration of a function of the present invention. Since the terminologies may vary according to an intention or a custom of an engineer working on a corresponding field, the terminologies should be defined based on overall contents of the present invention.

The present invention mentioned in the foregoing description can be implemented by codes readable by a computer in media in which a program is recorded. Media readable by a computer includes all kinds of recording devices in which data readable by a computer system is stored. Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet). And, the computer may include a controller of a wearable device. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

It will be apparent to those skilled in the art that various modifications and variations can be made in the present invention without departing from the spirit or scope of the inventions.

What is claimed is:

1. A display device comprising:
a memory configured to store at least one content;
at least one or more sensors;
a network interface module configured to communicate with at least one or more lights;
a display module configured to display the content stored in the memory; and
a controller configured to control the display module to display the content stored in the memory at a specific time and control the network interface module to transmit a control signal to a specific light at the specific time,
wherein:
the content includes an image including at least one object, the object having a shape of a specific theme, and
the controller is further configured to:
control the display module to display the image on a screen,
recognize, via the at least one or more sensors, a gesture of a user for changing the shape of the theme corresponding to the object; and
control brightness of the specific light, in response to the recognized gesture.

2. The display device of claim 1, wherein the control signal comprises ID information for identifying each of lights and information for indicating a level of brightness outputted by each of the lights.

3. The display device of claim 1, wherein the controller is further configured to change the content displayed via the display module in response to status information of a light received via the network interface module.

4. The display device of claim 3, wherein when the status information of the light corresponds to brightness of a first level, the controller is further configured to control the display module to display first content stored in the memory, and wherein when the status information of the light corresponds to brightness of a second level, the controller is further configured to control the display module to display second content stored in the memory.

5. The display device of claim 1, wherein when a size of the object is changed by the at least one or more sensors, the controller is configured to determine brightness of the specific light with reference to a database stored in the memory.

6. The display device of claim 1, wherein the at least one or more sensors include at least one of a touch sensor or a gesture recognition sensor.

7. The display device of claim 1, wherein the controller is further configured to control output of the content and transmission of the control signal according to a command stored in the memory in advance, a switch operation of a light, or a command received from a mobile device.

* * * * *